United States Patent [19]

Clark et al.

[11] Patent Number: 4,720,441

[45] Date of Patent: Jan. 19, 1988

[54] METHOD OF PREPARING A HOLOGRAM

[75] Inventors: John A. Clark, Altrincham; Alan Adshead, New Mills; David W. Butcher, Goostrey, all of England

[73] Assignee: Ciba-Geigy AG, Basel, Switzerland

[21] Appl. No.: 877,835

[22] Filed: Jun. 24, 1986

[30] Foreign Application Priority Data

Jun. 25, 1985 [GB] United Kingdom ............... 8516054

[51] Int. Cl.$^4$ .................... G03H 1/04; G03H 1/18; G03C 5/44
[52] U.S. Cl. .................................... 430/1; 430/2; 430/407
[58] Field of Search ................. 430/1, 2, 407, 408

[56] References Cited

U.S. PATENT DOCUMENTS

| | | | |
|---|---|---|---|
| 4,025,345 | 5/1977 | Kido et al. | 430/1 |
| 4,032,348 | 6/1977 | Kido et al. | 430/1 |
| 4,656,106 | 4/1987 | Holland et al. | 430/1 |

OTHER PUBLICATIONS

U.S. Army Corps of Engineers, "Review of Photosensitive Materials for Holographic Recordings", 4/78, pp. 68-72.

*Primary Examiner*—Richard L. Schilling
*Assistant Examiner*—Patrick A. Doody
*Attorney, Agent, or Firm*—Wenderoth, Lind & Ponack

[57] ABSTRACT

A method of preparing a hologram which comprises subjecting holographic material to a holographic exposure, the holographic material comprising a silver halide emulsion of which at least 80% by weight of the halide is bromide, developing the exposed material in a silver halide developing solution to yield developed silver, converting the residual silver bromide, in the main part at least, to silver iodide by use of an aqueous iodide solution, removing the developed silver but leaving the silver iodide either by use of a bleach/fix bath under controlled conditions or by rehalogenating the developed silver to silver bromide or chloride using a brominating or chlorinating silver bleach solution and simultaneously or subsequently fixing out the thus formed silver bromide or chloride using a fixing agent under such conditions that silver iodide is not dissolved from the material.

12 Claims, No Drawings

METHOD OF PREPARING A HOLOGRAM

This invention relates to a method of preparing a hologram. Holograms can be made using very fine grain silver halide sensitised photographic material by subjecting the material to a holographic exposure using a laser to produce an object and a reference beam. A series of interference fringes are set up which may be fixed in the material by a photographic developing step. These fringes may be used to reconstruct a hologram using either coherent or incoherent light depending on the exposure conditions employed.

Amplitude holograms are obtained when the developed silver is left in the photographic material and is used to reconstruct the holographic image. However, brighter holograms may be obtained when the developed silver is removed from material. In this case the unexposed silver halide is used to reconstruct the holographic image. A hologram which has been produced by this method is called a phase hologram.

Many holograms and especially phase reflection holograms are used for display purposes and such holograms are required to be as bright as possible. Bright holograms are those which have low scatter, and have a high diffraction efficiency.

Bright holograms can be obtained when the silver halide employed in the material is of very small crystal grain size and the method of processing involves the use of a solvent bleach which removes both the imagewise developed silver and also any non-imagewise developed silver (fog).

In order to obtain the desirably small silver halide crystal the silver halide employed in the photographic material usually contains a large amount of bromide. Very often silver iodobromide crystals are used, the bromide content being at least 80% by weight.

In the usual method of preparing a phase hologram a strong solvent bleach is required to remove the developed silver without removing the undeveloped silver halide. Most of these solvent bleaches are ecologically unsuitable. For example the most commonly used solvent bleach is an acidified dichromate solution and expensive procedures must be adopted for dealing with used dichromate solutions.

We have found a method for processing holograms which retains the advantages which would be obtained using a solvent bleach, but which does not in fact use a solvent bleach.

According to the present invention there is provided a method of preparing a hologram which comprises subjecting holographic material to a holographic exposure, the holographic material comprising a silver halide emulsion of which at least 80% by weight of the halide is bromide, developing the exposed material in a silver halide developing solution to yield developed silver, converting the residual silver bromide, in the main part at least, to silver iodide by use of an aqueous iodide solution, removing the developed silver but leaving the silver iodide either by use of a bleach/fix bath under controlled conditions or by rehalogenating the developed silver to silver bromide or chloride using a brominating or chlorinating silver bleach solution and simultaneously or subsequently fixing out the thus formed silver bromide or chloride using a fixing agent under such conditions that silver iodide is not dissolved from the material.

By use of a bleach/fix bath under controlled conditions that silver iodide is not dissolved out is meant using a bleach/fix bath of such a composition or for such a period of time that the silver iodide remains in the layer. If the residual silver bromide were not converted to silver iodide then the use of a bleach/fix bath under any conditions would result in the dissolution of most if not all the residual silver bromide from the layer and thus loss of the holographic image.

A bleach/fix bath of suitable composition comprises for example from 0.06 to 0.20 molar sodium thiosulphate. Alternatively a short bleach/fixing time of from 0.5 to 1.5 minutes can be employed using sodium thiosulphate. Or a combination of a weak thiosulphate solution together with a short bleach/fixing time may be employed as long as all the developed silver is removed by the bleach/fix bath.

In the rehalogenating step wherein bleaching in the presence of either chloride or bromide ions takes place the developed silver is converted to either silver chloride or silver bromide. Both of these salts are more soluble than silver iodide. Thus it is the important feature of this method of the present invention that during the fixing process the silver iodide is not fixed out whilst the silver chloride or bromide is fixed out. Silver chloride is more soluble than silver bromide and can be fixed out with, for example, a sulphite solution. Silver bromide can be fixed out using a sodium thiosulphate solution. Silver iodide is soluble to some extent in sodium thiosulphate solution, but if the fixing time is limited to less than four minutes, for example 0.5 to 1.5 minutes, only a very small amount of silver iodide is fixed-out. Other silver halide complexing agents can be used if they are capable of showing an accelerated rate of fixation for silver chloride or silver bromide compared with silver iodide, e.g. thiourea or uracil. Ammonium thiosulphate dissolves silver iodide rapidly and thus can not be used in the method of the present invention.

The rehalogenating bleaching step and the fixing step can be combined. In this case the silver bromide or chloride is fixed out as soon as it has been formed. But in this case urea or uracil should not be used as the silver complexing agent.

When using the bleach-fix bath which contains no chloride or bromide ions there is a greater chance that more silver iodide will be removed from the holographic material. Thus greater control of the fixing process is possible when separate bleach and fix processes are used.

It is an important part of the present invention that the residual silver bromide is converted to silver iodide before the developed silver is removed from the material. If for example the material containing the residual silver bromide and developed silver is treated with a rehalogenating bath containing iodide ions the silver is bleached to silver iodide and the residual bromide is in part at least converted to silver iodide, then the residual silver halide crystals tend to increase very greatly in size due to the deposition of silver iodide on them. This causes a high scattering of light in the holographic image when it is reconstructed.

The rehalogenating bleach step may be carried out using any silver bleaching agent which is capable of oxidising silver to silver chloride or bromide in the presence of chloride or bromide ions. Suitable bleaching agents include persulphates for example sodium and potassium persulphate, ferric salts for example ferric nitrate, ferric chloride and ferric sulphate, ferric aminocarboxylic acids for example ferric E.D.T.A., peroxides for example hydrogen peroxide, water-soluble quinones for example parabenzoquinone, bromates for example sodium and potassium bromate, chlorates for example sodium and potassium chlorate and combinations of these agents. These bleaching agents are ecologically more desirable than dichromates.

These bleaching agents may be used in the rehalogenating bath or in the bleach/fix bath with the exception of the ferric complexes which can not be used in a rehalogenating bleach bath which contains chloride ions.

The preferred bleaching agent is a ferric salt as these salts are cheap, entirely non toxic and thus present no waste nor effluent problems. Further they can be formulated to form stable solutions thus it is not required to make up fresh ferric solutions every time a holographic material is processed by the method of the present invention.

A particularly useful ferric salt is ferric nitrate.

It is difficult to obtain 100% conversion of silver bromide to silver iodide but a conversion of up to 97% using an alkali metal iodide aqueous solution is possible in about 2 minutes. Preferably a sodium or potassium iodide solution at a concentration of between 0.05M to 0.5M is used.

Preferably development is stopped by lowering the pH to below 7 using an aqueous acid solution for example a 2% acetic acid solution.

However the stop bath may be combined with the subsequent soluble iodide bath.

Preferably excess soluble iodide is removed from the holographic material after the iodide bath by means of a wash bath. If excess soluble iodide is present in the material during the rehalogenating step some loss in holographic diffraction efficiency will occur due to rehalogenation of the silver by iodide rather than the preferred bromide or chloride.

Preferably after the fixing process the holographic material is water washed and dried.

In the method of the present invention the residual silver halide particles are the same size after processing as before and have not been enlarged as in some other rehalogenating processes. Thus the material is inherently low light scattering. Any photographic type fog is removed during the bleaching and fixing steps. As the silver halide in the exposed areas is converted to developed silver, oxidised and then fixed out a net shrinkage of the emulsion layer and compression of the interference fringe spacing occurs. This causes a shift to shorter wavelength between the exposure wavelength and the replay wavelength when the hologram is made as a reflection hologram.

Thus in the process of the present invention no solvent bleach such as acidified dichromate is used. The residual halide which is required to form the image of a phase hologram is composed mainly of silver iodide which has a higher refractive index than silver bromide and this helps to improve the brightness of the resultant hologram.

Further as silver iodide is inherently less liable to print-out than silver bromide, holograms can be illuminated for long periods without appreciable print-out occuring.

The following Examples will serve to illustrate the invention.

EXAMPLE 1

Holographic material was prepared by coating onto a transparent photographic film base a gelatino silver halide emulsion which was substantially pure silver bromide having a mean crystal size of 0.035 microns at a silver coating weight of 30 mg/dm2. The emulsion was optically sensitised with a red sensitising dye so that it was optimally sensitive to 633 mm the colour of a He:Ne laser.

This material was holographically exposed using a Denisyuk exposure method using a brushed aluminum plate as an object to yield (after processing) a reflective hologram.

Two sets of exposures were made using different exposure times. One set was processed by the conventional method using an acidified dichromate solvent bleach as a comparative test.

Comparative test processing procedure:

Development for 2 minutes in a solution of the following formulation:

| Sodium Sulphite Anhydrous | 30 g |
| Hydroquinone | 10 g |
| Sodium Carbonate | 60 g |
| Water to | 1000 ml |

The samples were then transferred to an acidified dichromate bleach bath of the following composition:

| Potassium Dichromate | 4 g |
| Sulphuric Acid (conc.) | 4 g |
| Water to | 1000 g |

Until all silver metal had been bleached out which was about 2 minutes.

The samples were then washed in running water for 1 minute and dried.

The other set was processed using the method of the present invention.

The samples were developed in the following solution for 2 minutes:

| Sodium Sulphite (Anhydrous) | 30 g |
| Hydroquinone | 10 g |
| Sodium Carbonate | 60 g |
| Water to | 1000 ml |

After stirring in a 2% acetic acid solution the samples were placed in the following iodide bath for 2 minutes:

| Potassium Iodide | 15 g |
| Water to | 1000 ml |

XRF studies have shown that after 2 minutes 97% of the bromide in the emulsion has been replaced by iodide, further treatment did not result in further substitution. After washing in running water for 1 minute, the samples were bleached in a ferric ammonium EDTA/bromide bleach of the following composition for approximately 3 minutes:

| Fe(NH4) EDTA (1.8 M Solution) | 150 mls |
| KBr | 20 g |

| -continued | |
|---|---|
| Water to | 1000 ml |

Following bleaching, the rebrominated silver was fixed in a sodium thiosulphate solution (100 g/liter) for 2 minutes, washed for a further 1 minute in running water and dried.

The resulting phase holograms had a brightness of approximately 20% depending on exposure and had scatter values of less than 2%. Replay wavelengths varied between 456 and 501 nm also depending upon exposure, replaying at shorter wavelengths for longer exposures. These results compare favourably with the comparative set using acid dichromate bleach. In accelerated light stability tests, the iodinated holograms showed a 20% loss in efficiency after 2 days, but stabilised thereafter, there was no unsightly appearance of purplish print-out silver in the non-image areas. The comparative set showed a similar 20% reduction in efficiency after 2 days, but continued to print out so that efficiency was down by 50% after 2 weeks. The non-image areas suffered badly from unsightly purple print out after a few hours.

EXAMPLE 2

A series of reflection holograms of a brushed aluminium disk were recorded, developed, stopped, iodinated and washed as in Example 1. Bleaching then took place in a bleach of the following composition for 1½ to 2½ minutes.

| $Fe(NO_3)_3 \cdot 9H_2O$ | 30 g |
|---|---|
| KCl | 4 g |
| Water to | 1000 ml |

When bleaching was complete, the samples were removed from the bleach and fixed in a solution containing 50 g/l sodium sulphite for 3 minutes. Finally the samples were washed and dried.

Again, efficiencies were very similar to those obtained with the acid dichromate bleach.

Accelerated light stability tests showed similar results to those obtained in Example 1 when using the process of the present invention.

EXAMPLE 3

A series of reflection holograms of a brushed aluminium disk were recorded, developed, stopped, iodinated and washed as in Example 1. The material was then bleach-fixed in a blix bath of the following composition for 3 minutes.

| Fe Na EDTA | 66 g |
|---|---|
| $Na_2S_2O_3$ | 17.5 g |
| $Na_2SO_3$ | 1.65 g |
| $Na_2S_2O_5$ | 1.90 g |
| Water to | 1000 ml |

The material was then water washed and air-dried.

Using this process also the holograms had a brightness and scatter values similar to those obtained using an acid dichromate solvent bleach.

Accelerated light stability tests showed the processed material to be as light stable as the material produced by the process of the present invention as set forth in Example 1.

We claim:

1. A method of preparing a hologram which comprises subjecting holographic material to a holographic exposure, the holographic material comprising a silver halide emulsion of which at least 80% by weight of the halide is bromide, developing the exposed material in a silver halide developing solution to yield developed silver, converting the residual silver bromide, in the main part at least, to silver iodide by use of an aqueous iodide solution, removing the developed silver but leaving the silver iodide either by use of a bleach/fix bath under controlled conditions or by rehalogenating the developed silver to silver bromide or chloride using a brominating or chlorinating silver bleach solution and simultaneously or subsequently fixing out the thus formed silver bromide or chloride using a fixing agent under such conditions that silver iodide is not dissolved from the material.

2. A method according to claim 1 wherein the aqueous iodide solution comprises 0.05M to 0.5M sodium or potassium iodide.

3. A method according to claim 1 wherein development is stopped by lowering the pH to below 7 using an aqueous acid solution.

4. A method according to claim 3 wherein the aqueous acid is present in the soluble iodide aqueous solution.

5. A method according to claim 1 wherein the excess soluble iodide is removed from the holographic material after the iodide bath by use of a water wash bath.

6. A method according to claim 1 wherein the silver bleaching agent used is selected from a persulphate, a peroxide, a ferric aminocarboxylic acid, water soluble quinones, bromates, chlorates or a combination of these.

7. A method according to claim 1 wherein the silver bleaching agent used is a ferric salt.

8. A method according to claim 7 wherein the ferric salt is ferric nitrate.

9. A method according to claim 1 wherein the developed silver is removed by use of a bleach/fix bath which comprises sodium thiosulphate as the fixing agent and the length of treatment in the bath is not more than five minutes.

10. A method according to claim 9, wherein the length of treatment is from 0.5 to 1.5 minutes.

11. A method according to claim 1 wherein the developed silver is removed by use of a bleach/fix bath which comprises sodium thiosulphate at a strength of 0.06 to 0.2 molar thiosulphate.

12. A method according to claim 1 wherein the developed silver is removed by use of a rehalogenating bleach bath containing chloride ions and the resultant chloride is fixed out by use of a sulphite solution.

* * * * *